United States Patent [19]

Brown et al.

[11] Patent Number: 4,839,026

[45] Date of Patent: Jun. 13, 1989

[54] CATALYTIC CRACKING WITH REDUCED EMISSIONS OF SULFUR OXIDES

[75] Inventors: Stanley M. Brown, Scotch Plains; John W. Byrne, Saddle Brook, both of N.J.; Harry E. Jacobs, Glenwood, Ill.

[73] Assignee: Atlantic Richfield Company, Los Angeles, Calif.

[21] Appl. No.: 750,645

[22] Filed: Jun. 28, 1985

Related U.S. Application Data

[63] Continuation of Ser. No. 191,763, Sep. 29, 1980, abandoned, which is a continuation of Ser. No. 940,946, Sep. 11, 1978, abandoned.

[51] Int. Cl.$^4$ .............. C10G 11/02; C10G 11/04; C10G 11/05; C10G 11/18
[52] U.S. Cl. .................................. 208/120; 208/122; 208/124
[58] Field of Search .............. 423/244 R, 244 A, 563, 423/564; 208/120, 122, 124

[56] References Cited

U.S. PATENT DOCUMENTS

| | | | |
|---|---|---|---|
| 2,449,050 | 9/1948 | Bond, Jr. et al. | 208/122 |
| 2,887,450 | 5/1959 | Hirschler et al. | 208/120 |
| 3,364,136 | 1/1968 | Chen | 208/120 |
| 3,699,037 | 10/1972 | Annesser et al. | 208/120 |
| 3,823,092 | 7/1974 | Gladrow | 208/120 |
| 3,835,031 | 9/1974 | Bertolacini et al. | 208/120 |
| 3,930,987 | 1/1976 | Grand | 208/120 |
| 4,001,375 | 1/1977 | Longo | 423/244 R |
| 4,071,436 | 1/1978 | Blanton, Jr. et al. | 208/120 |
| 4,137,151 | 1/1979 | Csicsery | 208/120 |
| 4,153,534 | 5/1979 | Vasalos | 208/120 |
| 4,153,535 | 5/1979 | Vasalos et al. | 208/120 |
| 4,166,787 | 9/1979 | Blanton, Jr. et al. | 208/120 |
| 4,204,944 | 5/1980 | Flanders et al. | 208/120 |
| 4,206,039 | 6/1980 | Vasalos | 208/120 |
| 4,238,317 | 12/1980 | Vasalos et al. | 208/120 |
| 4,252,636 | 2/1981 | Mooi | 208/120 |

*Primary Examiner*—Asok Pal
*Attorney, Agent, or Firm*—F. Lindsey Scott

[57] ABSTRACT

Sulfur oxides are removed at least partially from the gaseous regenerator effluent of a fluid catalytic cracking unit operated with feedstock containing sulfur compounds and converted to hydrogen sulfide in the cracking zone by associating sulfur oxides in the gas with at least one rare earth compound, preferably cerium or a rare earth mixture rich in cerium, supported on discrete particles of alumina. The alumina particles may be a component of particles of a composite fluid cracking catalyst or separate fluidizable entities other than cracking catalyst and physically admixed with the catalyst particles.

14 Claims, No Drawings

4,839,026

CATALYTIC CRACKING WITH REDUCED EMISSIONS OF SULFUR OXIDES

This application is a continuation, of application Ser. No. 191,763, filed 9/29/80, which is in turn a continuation of application Ser. No. 940,946 filed Sept. 11, 1978, now both abandoned.

BACKGROUND OF THE INVENTION

The invention is concerned with the catalytic cracking of sulfur-containing hydrocarbon feedstock in a manner such as to effect a significant decrease in the emission of noxious oxides of sulfur in the gases emitted from the regeneration zone of a fluid catalytic cracking (FCC) unit. Carbon monoxide emissions may also be reduced.

A FCC unit is composed of three sections: cracking, regeneration and separation. The cracking reactions take place continuously in the reactor at temperatures between about 900° and 1000° F. The spent catalyst is often stripped with steam and continuously regenerated at about 1100° to 1400° F., and then recycled to the reactor. The cracked hydrocarbon products are finally separated, e.g., in a fractionation system.

The cracking of hydrocarbons that takes place during their contact with the catalyst results in carbonaceous deposits (coke) on the catalyst. Additionally, some sulfur, originally present in the feed hydrocarbons is also deposited on the catalyst. It has been reported that approximately 50% of the feed sulfur is converted to $H_2S$ in the FCC reactor, 40% remains in the liquid products and about 4 to 10% is deposited on the catalyst. These amounts vary with the type of feed, rate of hydrocarbon recycle, steam stripping rate, the type of catalyst, reactor temperature, etc.

Coke deposits tend to deactivate cracking catalyst. Cracking catalyst is advantageously continuously regenerated to low coke levels, typically below about 0.5% by weight, to perform satisfactorily before it can be recycled to the reactor. Carbonaceous material is typically removed from the catalyst in the regenerator by air oxidation. Here at least a portion of sulfur, along with carbon and hydrogen, which is deposited on the catalyst, is oxidized and leaves the regenerator in the form of sulfur oxides ($SO_2$ and $SO_3 = SOx$) along with substantial amounts of CO, $CO_2$ and $H_2O$. These oxidation reactions are highly exothermic and result in a release of heat in the regenerator. High temperatures can result in structural damage to units not designed to withstand high temperatures. Oxidation is carried out in many FCC units in an oxygen-lean atmosphere at about 1100° to 1250° F., resulting in incomplete combustion of carbon or carbon monoxide to a mixture with a $CO_2/CO$ ratio, for example, in the range of about 1/1 to 2/1. Some newer FCC units are equipped to operate under conditions such that there is substantially complete combustion of CO in the dense phase of the regenerator. These units operate above about 1250° F.

Considerable recent research effort has been directed to the reduction of sulfur oxide emissions in stack gases from the regenerators of cyclic FCC units. One technique involved circulating one or more metal oxides capable of associating with oxides of sulfur with the cracking catalyst inventory in the regeneration zone. When the particles containing associated oxides of sulfur are circulated to the reducing atmosphere of the cracking zone, the associated sulfur compounds are released as gaseous sulfur-bearing material such as hydrogen sulfide which is discharged with the products from the cracking zone and are in a form readily handled in FCC units. The metal reactant is regenerated to an active form, and is capable of further associating with sulfur oxides when cycled to the regenerator.

Incorporation of Group II metal oxides on particles of cracking catalyst in such a process has been proposed (U.S. Pat. No. 208/120 3,835,031 to Bertolacini). In a related process described in U.S. Pat. No. 208/120 4,071,430 to Blanton et al, discrete fluidizable alumina-containing particles are circulated through the cracking and regenerator zones along with physically separate particles of the active zeolitic cracking catalyst. The alumina particles pick up oxides of sulfur in the regenerator, forming at least one solid compound, including both sulfur and aluminum atoms. The sulfur atoms are released as volatiles, including hydrogen sulfide, in the cracking unit. U.S. Pat. No. 4,071,436 further discloses that 0.1 to 10 weight percent MgO and/or 0.1 to 5 weight percent $Cr_2O_3$ are preferably present in the alumina-containing particles. Chromium is used to promote coke burnoff. Similarly, a metallic component, either incorporated into catalyst particles or present on any one of a variety of "inert" supports, is exposed alternately to the oxidizing atmosphere of the regeneration zone of an FCCU and the reducing atmosphere of the cracking zone to reduce sulfur oxide emissions from regenerator gases in accordance with the teachings of Belgian Patents 849,635, 839,636 and 849,637 (1977). In Belgian 849,637, a metallic oxidation promoter such as platinum is also present when carbon monoxide emissions are to be reduced. These patents disclose nineteen different metallic components, including materials as diverse as alkaline earths, sodium, heavy metals and rare earth, as being suitable reactants for reducing emissions of oxides of sulfur. The metallic reactants that are especially preferred are sodium, magnesium, manganese and copper. When used as the carrier for the metallic reactant, the supports that are used preferably have a surface area at least 50 square meters per gram. Examples of allegedly "inert" supports are silica, alumina and silica-alumina. The Belgian patents further disclose that when certain metallic reactants (exemplified by oxides of iron, manganese or cerium) are employed to capture oxides of sulfur, such metallic components can be in the form of a finely divided fluidizable powder.

Similarly, a vast number of sorbents have been proposed for desulfurization of non-FCCU flue gases in zones outside the unit in which SOx is generated. In some such non-FCCU applications, the sorbents are regenerated in environments appreciably richer in hydrogen than the cracking zone of an FCC unit. Cerium oxide is one of fifteen adsorbents disclosed for flue gas desulfurization in a publication of Lowell et al, "SELECTION OF METAL OXIDES FOR REMOVING SOx FROM FLUE GAS," Ind. Eng. Chemical Process Design Development, Vol. 10, No. 3, 1971. In U.S. Pat. No. 4,001,375 to Longo, cerium on an alumina support is used to absorb $SO_2$ from non-FCCU flue gas streams or automobile exhaust at temperatures of 572° to 1472° F., preferably 932° to 1100° F. The sorbent is then regenerated in a separate unit by contacting it with hydrogen mixed with steam at 932° to 1472° F. During regeneration the desorbed species is initially $SO_2$ and subsequently $H_2S$ is evolved. The resulting mixture of $SO_2$ and $H_2S$ along with excess reducing gases can be used as feedstock for a Claus unit. The Longo patent is not concerned with reducing emissions from a FCC unit and the reducing atmosphere employed in practice of his process differs significantly from the hydrocarbon-rich atmosphere in a catalytic cracker. Thus a hydrocarbon cracking reaction zone is preferably operated in the substantial absence of added hydrogen while the presence of sweeping amounts of hydrogen gas is essential to the regeneration step in practice of the process of Longo.

D. W. Deberry et al, "RATES OF REACTION OF $SO_2$ WITH METAL OXIDES," Canadian Journal of Chemical Engineering, 49, 781 (1971) reports that cerium oxide was found to form sulfates more rapidly than most of the other oxides tested. The temperatures used, however, were below 900° F. and thus below those preferred for use in catalyst regenerators in FCC units.

Many commercial zeolitic FCC catalysts contain up to 4% rare earth oxide, the rare earth being used to stabilize the zeolite and provide increased activity. The rare earths are most often used as mixtures of $La_2O_3$, $CeO_2$, $Pr_6O_{11}$, $Nd_2O_3$ and others. Some catalyst is produced by using a lanthanum-rich mixture obtained by removing substantial cerium from the mixture of rare earth. It has been found that the mere presence of rare earth in a zeolitic cracking catalyst will not necessarily reduce SOx emissions to an appreciable extent.

In accordance with the teachings of U.S. Pat. No. 3,823,092 to Gladrow, certain zeolitic catalyst compositions capable of being regenerated at a rate appreciably faster than prior art rare earth exchanged zeolitic catalyst compositions are produced by treating a previously rare earth exchanged zeolitic catalyst composition with a dilute solution containing cerium cations ( or a mixture of rare earths rich in cerium). The final catalysts contain 0.5 to 4% cerium cations which are introduced to previously rare earth exchanged zeolitic catalyst particles prior to final filtering, rinsing and calcining. Cerium is described as an "oxidation promoter". There is no recognition or appreciation in the patent of the effect of the cerium impregnation on SOx stack emissions. Such impregnation of rare earth exchanged zeolitic catalyst particles is not always effective in producing modified catalysts having significant ability to bind oxides of sulfur in a FCC regenerator and release them in a FCC cracking reaction zone.

Thus, considerable amount of study and research effort has been directed to reducing oxide of sulfur emissions from various gaseous streams, including those from the stacks of the regenerators of FCC units. However, the results leave much to be desired. Many metallic compounds have been proposed as mat aerials to pick up oxides of sulfur in FCC units (and other desulfurization applications) and a variety of supports, including particles of cracking catalysts and "inerts," have been suggested as carriers for active metallic reactants. Nevertheless, prior to the present invention, a versatile effective technique for using a metallic compound to pick up and then release SOx in a FCC unit without impairing the effectiveness of the active zeolitic cracking catalyst has not met general acceptance in refineries. Many of the proposed metallic reactants lose effectiveness when subjected to repeated cycling. Thus when Group II metal oxides are impregnated on FCC catalysts or various supports, the activity of the Group II metals is rapidly deactivated under the influence of steam. Discrete alumina particles, when combined with silica-containing catalyst particles and subjected to steam at elevated temperatures, e.g., those present in FCC unit regenerators, are of limited effectiveness in reducing SOx emissions. Incorporation of sufficient chromium on an alumina support to improve SOx sorption results in undesirably increased coke and gas production. It has been found that members of the allegedly "inert" supports for metallic reactants mentioned in the Belgian patents (supra) are not capable of stabilizing metallic compounds theoretically capable of picking up SOx in a regenerator and releasing sorbed sulfur in the cracking zone.

Accordingly, an object of the instant invention is the provision of improved means for reducing emissions of sulfur oxides, and optionally carbon monoxide, from FCC units by circulating a reagent for associating with SOx in a regenerator and disassociating sulfur compounds in the cracking unit reaction zone and/or the stripping zone.

SUMMARY OF THE INVENTION

This invention results from the discovery, unpredictable from the prior art, that the combination of rare earth, preferably cerium oxide, and certain forms of alumina function to reduce SOx emissions in FCC units and these materials, used in combination, maintain their effectiveness under conditions that render other proposed metallic SOx sorbents ineffective without impairing the yield of valuable hydrocarbon products achieved during hydrocarbon cracking.

The present invention involves the use of fluidizable attrition-resistant particles comprising at least one rare earth compound, preferably cerium, rare earth mixture rich in cerium, lanthanum or rare earth mixture rich in lanthanum, most preferably cerium or rare earth mixture rich in cerium, supported or deposited on discrete particles of alumina to reduce emissions of oxides of sulfur in the gaseous effluents of fluid catalytic cracking units operating with sulfur-containing feedstocks. The particles associate at least partially with oxides of sulfur in the regenerator flue gas to form one or more solid sulfur-containing compounds and these compounds are released as hydrogen sulfide in the cracking zone of the unit.

The discrete particles of alumina used as a support for the rare earth compound may be present as a component of particles of a fluidizable acidic catalytic cracking catalyst or, preferably, the alumina supporting the rare earth compound(s) may be present in fluidizable particles other than cracking catalyst particles and physically admixed with the cracking catalyst particles when the cracking catalyst particles are cycled through the cracking and regeneration zones of a fluid catalytic cracking unit. Most preferably the discrete particles of alumina supporting the rare earth compound are fluidizable particles of high purity alumina. A given amount of rare earth treated alumina is considerably more effective when the alumina is present in discrete entities other than particles of cracking catalyst as compared to discrete alumina present in catalyst particles.

At least a portion of the discrete alumina used as a support for the rare earth must be "free" alumina (present as a simple oxide), and in an "active" form. By "active" form is meant alumina capable in the absence of rare earth supported thereon of associating with oxides of sulfur in the gaseous regenerator effluent and releasing them as hydrogen sulfide in the cracking zone at least during initial cycling of the catalyst particles between the cracking zone, regeneration zone and recycle to the cracking zone of the fluid catalytic cracking unit. When all or most of the alumina is in combined form, for example present as a binary oxide such as silica-alumina or a ternary oxide, positive interaction between rare earth and alumina, resulting in improved reduction of SOx emissions, is not observed. Thus when the discrete alumina particles are a component of the cracking catalyst particles, the particles of equilibrium cracking catalyst must be capable in the absence of deposited rare earth of associating with at least a portion of oxides of sulfur in the regeneration zone and releasing them as hydrogen sulfide in the regenerator zone. The term "equilibrium" refers to the state or condition of the catalyst particles after repeated regeneration and reuse in cracking. Similarly, when the rare earth-treated alumina is present as discrete entities other than cracking catalyst and such entities are in physical admixture with cracking catalyst, the equilibrium alumina-containing entities are capable, in the absence of rare earth deposited thereon, of decreasing the amounts of oxides of sulfur present in the flue gas as compared to the levels of oxides of sulfur that would be produced in the absence of the alumina-containing entities. Discrete entities of silica-alumina wherein all of the alumina is in combined form will not suffice as a support for rare earth and entities wherein most of the alumina is in combined form will be inefficient as compared to entities composed solely or predominantly of free high purity alumina.

In practice of the invention, the rare earth compound(s) must be supported on the alumina per se although one or more rare earth materials may be present with one or more constituents of the solid entities, of which the discrete alumina may be a component. For example, many presentday commercial composite zeolitic cracking catalysts contain rare earth such as cerium or a rare earth mixture associated with the zeolite component as a result of ion-exchange with cations originally associated with the zeolite. When such composite catalysts also contain discrete free alumina as a matrix component, the rare earth will normally not be supported or deposited to an appreciable extent on the discrete alumina in the matrix when conventional ion-exchange techniques are practiced to prepare the catalyst particles. For the most part, the rare earth will be present with the zeolitic component and, in this state or condition, the rare earth will not synergistically act with the alumina in the same catalyst particles to reduce sulfur oxide emissions as it will when the rare earth is supported on the alumina particles. Therefore, unless exchange with rare earth is carried out under conditions such that additional rare earth is deposited on at least a portion of the discrete alumina particles in the matrix of composite catalyst particles, it will be necessary to deposit rare earth on discrete alumina components on such catalyst particles by additional processing. This may be accomplished, for example, by impregnating the finished catalyst particles with rare earth or by impregnating the alumina component prior to incorporation of the alumina particles into the catalyst matrix.

In an embodiment of the invention wherein alumina supporting the rare earth is contained in the particles of a composite cracking catalyst, preferably catalyst particles containing a zeolitic component, the particles of cracking catalyst are cycled through a FCC unit between a cracking zone in the substantial absence of added hydrogen. In the cracking zone the particles of cracking catalyst which constitute the support for rare earth are contacted with sulfur-containing hydrocarbon feedstock which is cracked into lower boiling hydrocarbons. Carbonaceous material deposits on the catalyst particles, thereby deactivating the catalyst particles. This carbonaceous deposit contains sulfur compounds. Deactivated cracking catalyst particles containing sulfur-bearing carbonaceous material are separated from cracker effluent and are passed into the regenerator where at least a portion of such deposit is combusted, thereby producing gaseous oxides of sulfur and carbon. Oxides of sulfur associate with rare earth supported on the alumina-containing cracking catalyst particles in the regenerator zone, thereby removing at least partially oxides of sulfur that would normally be discharged in the gaseous effluent from the regenerator. Regenerated cracking catalyst particles are cycled to the cracking zone where there is a reducing atmosphere created by the presence of volatile hydrocarbons. In the cracking zone and preferably also in the steam stripping zone immediately following the cracking zone, oxides of sulfur (which became associated with the catalyst particles in the regenerator) are released or disassociated as $H_2S$ from the alumina-containing cracking catalyst particles supporting rare earth. The particles of cracking catalyst, which again bear a sulfur-containing carbonaceous deposit, are recycled to the regenerator for combustion of the carbon and sulfur materials and for further association of the resulting oxides of sulfur with the cracking catalyst particles.

In the preferred embodiment of the invention wherein rare earth treated alumina is present as fluidizable entities separate from the particles of cracking catalyst and in physical admixture therewith, the process is carried out in similar manner, preferably with controlled addition of the amount of rare earth treated alumina entities to the circulating inventory of catalyst particles, depending upon the sulfur content of the feed and level of SOx permissible in the flue gas. A mixture of alumina rich particles treated with rare earth and in physical mixture with cracking catalyst particles is cycled through a FCC unit operated in continuous cycles through a cracking zone in the substantial absence of added hydrogen and wherein the catalyst particles are contacted with a sulfur-containing hydrocarbon feedstock. The feedstock is cracked into lower boiling hydrocarbons in the cracking zone, causing deposition of a sulfur-containing carbonaceous material on the catalyst particles, which material deactivates the catalyst particles. The deactivated catalyst particles, along with particles of rare earth supported on alumina, are separated from the cracker effluents and are passed to a regeneration zone where at least a portion of the deposited material is combusted, producing gaseous oxides of sulfur and carbon. At least a portion, preferably a major portion, of the oxides of sulfur are associated with the separate particles containing rare earth in the regeneration zone and are released or disassociated from these particles when the catalyst particles, along with the particles of rare earth on alumina, are recycled to the reducing atmosphere created by the hydrocarbons in the reaction (cracking) zone. In the cracking zone, and preferably also in the steam stripping zone immediately following the reaction zone, sulfur is released as $H_2S$, and the rare earth-alumina particles are cycled back to the regenerator for further SOx association.

It is also within the scope of the invention to utilize cerium or rare earth supported or deposited on alumina-containing particles of fluid cracking catalyst in physical admixture with separate fluidizable entities of cerium or rare earth supported or deposited on alumina rich particles, preferably particles of high purity alumina.

In one preferred embodiment of the invention, fluidizable particles of cerium supported or deposited on alumina are used in a continuous cyclic FCC process wherein the regenerator operates in a partially oxidizing mode, i.e., in a regenerator where excessive heat due to complete CO oxidation cannot be tolerated and the regenerator operates at about 1100° to 1250° F.

One advantage of the rare earth supported on alumina particles in accordance with the present invention is the capability of substantial SOx pickup without operating the FCC unit in full oxidizing, e.g., high temperature, mode.

However, the present particles of rare earth deposited on alumina are also advantageously used in a continuous cyclic FCC process wherein the regenerator operates in a complete or substantially complete oxidizing mode. Optionally, a strong carbon monoxide oxidation promoter (e.g., platinum), is circulated with catalyst particles and the rare earth supported alumina particles in practice of this embodiment. The oxidation promoter can be added to the catalyst particles or to the hydrocarbon feedstream or regenerator as a liquid. Alternatively the oxidation promoter can be used as discrete entities on a solid support which is not necessarily the same alumina support on which the rare earth is present.

As noted previously, the present invention involves the use, as a support for rare earth, of alumina that is preferably substantially free from oxides of other metals, such as silica and alkali metals, e.g., sodium. Contrary to the prior art teaching of equivalence between silica-alumina, silica and alumina as supports for metallic oxide reactants for oxides of sulfur, high purity alumina is advantageously suited for the purposes of the present invention. When other so-called "inert" particles, such as silica or silica-alumina, are used as the support for the rare earth, the discrete fluidizable entities are effective in some cases in reducing SOx emissions when the supported particles are initially used (fresh condition). However, the presence of appreciable silica in association with alumina does not provide a stable rare earth oxide supported catalyst and the material is of limited, if any, practical use in a cyclic FCC process in which such particles are repeatedly recycled with catalyst inventory and subjected to the action of steam; e.g., in the stripping and regeneration zones. Similarly, when about 10% cerium oxide was supported on a widely used zeolitic cracking catalyst, containing substantially no free alumina, the cerium was effective in the fresh condition but after hydrothermal treatment, which simulated conditions found in commercial units, the catalyst had virtually no effect on SOx reduction. However, cerium was quite effective when impregnated on another zeolitic cracking catalyst that contained appreciable free gamma-alumina even after the cerium impregnated catalyst underwent severe hydrothermal treatment.

A correlative feature of the present invention resides in the use of rare earth compound as a deposit agent, e.g., impregnant, on the aforesaid alumina. Cerium oxide (or cerium rich rare earth oxide) supported on alumina is significantly more effective for removal of sulfur oxides than is either pure alumina or magnesia or a variety of other metal oxides on pure alumina. When chromium oxide supported on pure alumina was used for SOx emissions, results of testing indicated that there was an undesirable increase in the coke producing tendencies of the zeolitic cracking catalyst. This problem was not experienced when cerium or cerium-rich rare earth mixture was supported on high purity alumina. In addition, the use of particulate cerium (or cerium rich rare earth) on alumina is effective in reducing carbon monoxide emissions in a controlled manner from FCC units without requiring the use of an expensive platinum group metal oxidation promoter.

DESCRIPTION OF PREFERRED EMBODIMENTS

Present-day continuous cyclic FCC processes utilize fluidizable catalyst particles which comprise a porous inorganic oxide (or mixed oxides) matrix, usually silica-alumina, and preferably also contain a crystalline zeolitic aluminosilicate promoter component (usually an ion-exchanged form of synthetic faujasite such as zeolite X or Y). Sodium content of the catalyst particles is usually less than 1% by weight. Illustrative of such catalysts are those described in U.S. Pat. Nos. 3,140,249 and 3,140,253 to Plank et al, and U.S. 3,647,718 to Haden et al. The particular method for forming the catalyst and the specific composition of the catalyst may vary widely in practice of the instant invention. Thus a wide variety of commercially available fluid cracking catalysts may be employed. The surface area of commercial equilibrium cracking catalysts is usually in the range of about 75 to 200 $m^2/g$. when measured by the conventional B.E.T. method (nitrogen absorption).

In practice of the especially preferred embodiment of the invention, the alumina support material is in the form of fluidizable attrition-resistant particles having a tapped density similar to that of typical FCC catalysts (for example, about 0.7 to 1.0 g./cc. and preferably about 0.80 to 1.0 g./cc.). The alumina should have a surface area of at least about 10 $m^2/g.$, preferably at least about 50 $m^2/g.$ (determined by the well-known B.E.T. method using nitrogen as absorbate). The alumina in the support can be gamma, eta, chi, delta, alpha, kappa, theta and the like and mixtures thereof. The alumina preferably contains less than about 1% by weight (anhydrous basis) of silica and less than about 0.5% by weight of alkali metal oxides. A presently preferred method for producing the alumina support in desired fluidizable, attrition-resistant and dense form utilizes commercially available spray dried beads of high purity alpha alumina monohydrate, exemplified by CATAPAL ® SB alumina as a starting material. To increase density, CATAPAL SB is redispersed in water using a conventional dispersant for colloidal alumina, such as nitric acid, to form a slurry capable of being spray dried; for example, a 25% solids slurry. The slurry is spray dried and the desired size fraction is recovered for use as a support for rare earth. Typically the alumina particles have diameters in the range of about 10 to 250 microns. When preparing the alumina by this means, the spray dried alumina particles must be steamed or calcined before addition of rare earth compound. Such heat treatment is necessary when preparing the alumina from redispersed, redried alumina because a paste-like mass would result upon impregnation of uncalcined redried CATAPAL with rare earth salt. The heat treatment, carried out at a temperature sufficiently high to avoid this problem, for example, about 1000° to 1200° F., dehydrates the alpha alumina monohydrate, forming gamma and/or other forms of alumina. When calcination temperature is excessive, for example 2000° F., the surface area of the alumina may undergo an undesirable decrease to a value below about 10 m²/g.

Cerium or other suitable rare earth or rare earth mixture may be deposited on the alumina using any suitable technique or combination of techniques; for example impregnation, ion-exchange and the like, well known in the art, with impregnation being preferred. Impregnation may be carried out by contacting the alumina particles with a solution, preferably aqueous, of rare earth; for example, a solution containing cerium ions (preferably $Ce^{+3}$, $Ce^{+4}$ or mixtures thereof) or a mixture of rare earth cations containing a substantial amount (for example, at least 40%) of cerium ions. Water-soluble sources of rare earth include the nitrate and chloride. Solutions having a concentration (weight) in the range of 3 to 30% are useful. Sufficient rare earth salt is added to incorporate from about 0.05 to 20% (wt.), preferably about 0.1 to 10% rare earth, and most preferably about 0.5 to 10% rare earth, by weight, calculated as oxide, on the particles.

It is not necessary to wash alumina particles after certain soluble rare earth salts (such as nitrate or acetate) are added. After impregnation with rare earth salt, the particles can be dried and calcined to decompose the salt, forming an oxide in the case of nitrate or acetate. Alternatively the particles can be charged to a FCC unit with the rare earth in salt form. In this case a rare earth salt with a thermally decomposable anion can decompose to the oxide in the reactor and be available to associate with SOx in the regenerator.

Especially good results were achieved using particles of alumina impregnated with 7% cerium oxide, by weight, calculated as $CeO_2$ and mixed with commercial zeolitic FCC catalyst in amount such that the cerium impregnated alumina particles were present in amount in the range of about 5 to 25% by weight of the mixture.

When too much rare earth such as cerium is present and/or an excessive quantity of the rare earth supported particles are circulated with catalyst inventory, the cracking properties of the overall catalyst system may be adversely affected. For example, the catalyst may produce too much coke and/or gases. On the other hand, when insufficient rare earth such as cerium is employed and/or an insufficient quantity of supported particles are used, the reduction in levels of SOx emissions may be inadequate. In general, high rare earth concentrations are indicated when the feedstocks are highly contaminated with sulfur.

In practice of the invention, the rare earth treated alumina particles are circulated as discrete entities with the catalyst inventory at a rate which can be flexibly altered to reduce SOx emissions to a desired level. Preferably the rare earth supported alumina particles are employed in an amount within the range of about 0.5 to 25%, more preferably about 3 to 20%, based on the weight of the particles of cracking catalyst in the circulating cracking catalyst inventory. Preferably the circulating inventory (cracking catalyst particles and rare earth supported alumina) will analyze rare earth (as oxide) in amount within the range of about 0.002 to 4.0%, more preferably about 0.01 to 1.0% in addition to rare earth ion-exchanged onto particles of cracking catalyst, based on the total weight of the mixture. The rare earth supported alumina particles can be steamed or calcined before they are introduced into the reaction system. However, steaming or calcining is not necessary.

When the rare earth is to be deposited on particles of cracking catalyst, preferably a zeolitic catalyst, the catalyst must contain appreciable alumina present as a simple oxide; for example, gamma alumina or other transitional forms of alumina enumerated above. The catalyst should contain at least 5%, preferably at least 10% and most preferably at least 20% by weight free alumina. Alumina may be incorporated into the matrix as discrete particles during catalyst manufacture; for example by incorporating finely divided gamma alumina with the zeolite and matrix components before particle formation (e.g., spray drying). Alternatively alumina may be formed during catalyst manufacture; an example is alumina formed in carrying out the process described in U.S. Pat. No. 3,647,718 to Haden et al.

Rare earth salt, preferably cerium, rare earth rich in cerium (e.g., 40% or more cerium), lanthanum, or rare earth rich in lanthanum (e.g., 40% or more lanthanum) is deposited on catalyst particles containing the alumina in amount sufficient to deposit from about 1 to 15% (wt.), preferably 2 to 10% rare earth, and most preferably 5 to 10% on the catalyst particles.

Methods used for impregnating alumina entities other than catalyst particles described above can be used to deposit rare earth on catalyst particles. Alternatively the rare earth can be deposited on alumina particles incorporated with other components before forming fluidizable particles provided the formed particles are not subjected to further treatment which would wash the deposited rare earth from the alumina. Similarly, ion-exchange can be employed to deposit rare earth on the alumina component of a composite cracking catalyst unless the ion-exchange treatment itself and/or subsequent treatment removes the rare earth from the alumina component.

The invention is particularly useful in any of the many catalytic cracking unit designs used in the fluid catalytic cracking of petroleum feedstock such as gas-oils and heavier stocks containing sulfur, preferably about 0.1 to 5%, more typically about 0.5 to 2.5% by weight of sulfur. Preferably, substantially no hydrogen is added to the reactor in these processes.

Exemplary of a useful reactor-regenerator system that can be employed in practice of our invention is the riser reactor illustrated in U.S. Pat. No. 3,944,482 to Mitchell. This patent also sets forth ranges of operating conditions for the reactor, stripper, regenerator and fractionation zones of such an FCC unit. The disclosure of the Mitchell patent relative to the structure and mode of operation of a riser reactor-regenerator system is incorporated herein by cross reference. It will be noted that the Mitchell patent disclosed reaction zone temperature ranges of about 900° to 1100° F., preferably about 950° to 1050° F., pressures between about 10 and 35 p.s.i.g. and residence times of catalyst in the riser from about 0.5 to 5 seconds. From this it is apparent that the modification of the circulating catalyst inventory to provide for sulfur association in the regenerator of a riser cracker must be such that the associated sulfur compounds can be released at 900° to 1100° F. in the reducing atmosphere of a riser cracker to be useful in reducing SOx emissions. Attention is also directed to the disclosure in the Mitchell patent of the introduction of steam into the catalyst stripper zone to remove contained hydrocarbon before the deactivated catalyst passes through a transfer line to the regenerator. Steam stripping or stripping with an inert gas at conversion reaction temperature may be carried out prior to regeneration when the catalyst is further subjected to high temperatures in the presence of steam. Thus the modified catalyst should be resistant to steam deactivation. This consideration excludes many metal oxides which have the capacity to associate with SOx under FCC regeneration conditions. Gaseous sulfur-containing products, especially $H_2S$, that are produced by release of the associated sulfur compound(s) in the reducing atmosphere of the reaction zone appear in the gaseous fraction of the reaction zone effluent and the gaseous effluent from the stripper. Such gaseous sulfur compounds can be processed in Claus units normally associated with FCC units and do not present the environmental or practical difficulties resulting from the presence of SOx in flue gases of FCC unit regenerators.

The operating conditions of FCC unit regeneration zones are conventional and well known in that art. Regeneration zone temperatures may be in the range, for example, of about 1000° to about 1600° F., preferably about 1100° F., to about 1500° F.

The Mitchell patent describes operation of a regenerator with the dense catalyst bed at about 1250° F. and the use of an approximately stoichiometric amount of oxygen to minimize afterburning. Other regeneration systems and modes of operation may be utilized; for example, the regeneration system and method described in U.S. Pat. No. 3,909,393 to Horecky et al. In practice of the Horecky et al patent, the full disclosure of which is incorporated by reference herein, the dense bed stage is carried out at a temperature of about 1150° to 1400° F., preferably about 1250° F., and oxygen is used in amount in excess of that theoretically required. Complete combustion of carbon monoxide in the dilute-phase zone in the Horecky et al regenerator is maintained at about 1200° to 1500° F., preferably about 1300° to 1400° F.

Residence time in regenerators varies in the range of about 3 to 120 minutes, preferably about 3 to 75 minutes. Pressures range up to 100 p.s.i.g. Irrespective of the regeneration system used, it is obvious that the catalyst modifier must be capable of associating with sulfur compounds in the flue gases leaving the regenerator and disassociating the associated sulfur compounds in the reducing atmosphere present in the cracking reaction zone.

The following examples are given for illustrative purposes.

EXAMPLE I

In accordance with the present invention, the following procedure was used to produce an attrition-resistant, high bulk density gamma and/or other form of alumina support. CATAPAL SB (alpha alumina monohydrate) was used as the starting material. The CATAPAL SB is reported by the supplier to have the following chemical composition:

| Composition, Wt. % | Typical | Specification |
|---|---|---|
| $Al_2O_3$ | 74.2 | 70–78 |
| Total Ignition Loss | 25.7 | — |
| Carbon | 0.36 | 0.5 Maximum |
| $Fe_2O_3$ | 0.004 | 0.01 Maximum |
| $Na_2O$ | 0.003 | 0.01 Maximum |
| $SiO_2$ | 0.003 | 0.01 Maximum |
| Sulfur | Nil | 0.01 Maximum |

| Composition, Wt. % | Typical | Specification |
|---|---|---|
| $TiO_2$ | 0.120 | 0.31 Maximum |

Bulk density is 0.70 gm./cc. (loose) and 0.83 (packed). Particle size is typically 10 to 15% by weight finer than 90 microns and 45 to 50% finer than 45 microns.

To increase the density and improve the attrition resistance of CATAPAL SB, the material was redispersed and the redispersed slurry was spray dried under conditions selected to achieve these results. The following procedure was used.

A 70% weight solution of nitric acid was added to water in amount sufficient to provide 1.0 weight percent $HNO_3$ based on the total weight of a 25% solids slurry of CATAPAL SB. To the dilute nitric acid solution CATAPAL SB was added with agitation to produce the 25% solids slurry (25 pounds CATAPAL SB "as received" in 100 pound slurry). The slurry was agitated for 30 minutes and then aged for about 20 hours, resulting in an increase in viscosity. The viscous slurry was spray dried in a Bowen spray dryer using a wheel operated at 18,000 r.p.m. to atomize the slurry. Air inlet temperature was about 750° F.; air outlet temperature was about 212°–230° F. The spray dried beads were classified and a fraction in the range of 45 to 150 microns was recovered and calcined at 1100° F. for two hours in air.

Portions of the calcined alumina particles were impregnated with cerium nitrate ($Ce(NO_3)_3$) solutions of 4.8 to 22% concentration (weight) to deposit from 2 to 10% by weight cerium (reported as $CeO_2$) on the particles.

The impregnated particles were then calcined in air at 1100° F. to eliminate oxides of nitrogen. The procedure was repeated with a commercial lanthanum-rich rare earth nitrate solution for purposes of comparison. The mixed rare earth was reported to contain 60% $La_2O_3$, 6% $CeO_2$, 8% $Pr_6O_{11}$, 25% $Nd_2O_3$ and 1% others.

SOx pickup was measured by a fixed fluidized test unit in which 10–14 grams of test sample were contacted at 1200° F. with 200 cc./min. of a gas mixture typically consisting of 2000 p.p.m. $SO_2$, 4.5% CO, 6.5% $CO_2$ and 3.0% $O_2$ in $N_2$ for twelve minutes. This gas mixture was selected to resemble a typical FCC regenerator environment. Flue gas composition was monitored continuously for CO, $CO_2$ and $SO_2$ by individual IR cells and for $O_2$ by an oxygen analyzer. Rate as well as capacity for SOx absorption could thus be evaluated. The percent reduction of $SO_2$ indicated by IR was also compared to percent SOx picked up determined by an analytical method (LECO).

All samples were steamed for four hours at 1400° F. prior to testing to simulate an equilibrium condition.

For purposes of comparison the SOx capacity of HFZ®-20 zeolitic cracking catalyst was measured. This high alumina catalyst was selected because of its higher capacity for reducing SOx emissions compared to other commercial cracking catalysts. For further purposes of comparison, samples of the spray dried alumina were impregnated, as described above, with aqueous solutions of other metal salts, including salts of chromium and magnesium, followed by calcination at 1100° F. For further purposes of comparison, an unimpregnated sample of the gamma alumina support (prepared from CATAPAL) was tested.

Results of SOx pickup under conditions simulating the environment of a regenerator operated without complete CO oxidation, as described above, produced results summarized below in Table I.

Data in Table I demonstrate the SOx pickup ability of rare earth oxides, particularly $CeO_2$, supported on discrete particles of gamma alumina. Results of the SOx screening test, as summarized in the table, show that these materials, when mixed with HFZ catalyst exhibited excellent SOx pickup. ($CrO_3$ supported on alumina similarly showed good SOx pickup.) However, when admixed with HFZ-20 at a 14% level, up to 7.3% MgO supported on alumina, which was described in the prior art, showed no increase in SOx pickup as compared with a pure gamma alumina control sample run under identical conditions.

TABLE I

SOₓ PICK-UP FOR STEAMED SAMPLES OF HFZ-20 CRACKING CATALYST PLUS SEPARATE PARTICLES OF SUPPORTED METAL OXIDE[1]

| SAMPLE[2] | Reduction by IR[3] CO | Reduction by IR[3] SO₂ | SOₓ PICK-UP[4] |
|---|---|---|---|
| HFZ-20 CRACKING CATALYST | 21% | 12% | 17% |
| 86% HFZ-20 + 14% (γ-Al₂O₃) | 28% | 32% | 40% |
| 86% HFZ-20 + 14% (8.2% CeO₂/γ-Al₂O₃) | 71% | 84% | 72% |
| 86% HFZ-20 + 14% (5.4% CeO₂/γ-Al₂O₃) | 67% | 80% | 72% |
| 86% HFZ-20 + 14% (4.7% REO/γ-Al₂O₃) | 38% | 70% | 57% |
| 86% HFZ-20 + 14% (1.7% CrO₃/γ-Al₂O₃) | 70% | 70% | 66% |
| 86% HFZ-20 + 14% (γ-Al₂O₃)* | 18% | 47% | 45% |
| 86% HFZ-20 + 14% (3.2% MgO/γ-Al₂O₃)* | 23% | 55% | 45% |
| 86% HFZ-20 + 14% (7.3% MgO/γAl₂O₃)* | 23% | 55% | 48% |

[1] 12 minutes of 200 cc/min. of reaction gas; CO (4.50%), CO₂ (6.50%), SO₂ (2900 ppm), O₂ (3.0%) in N₂ at 1200° F.:
*CO (4.50%), CO₂ (5.00%), SO₂ (2250 ppm), O₂ (3.0%) in N₂ at 1200° F.: Steamed = 100% steam @ 1400° F. for four hours.
[2] 12 g (86%) of HFZ-20 (steamed @ 1400° F.) plus 2 g (14%) of additive; metal oxide via impregnation with metal nitrate solution then calcination; determined by EM & C Analytical Dept.; REO = 60% La₂O₃, 6% CeO₂, 8% Pr₆O₁₁, 25% Nd₂O₃, 1% other. Additive steamed at 1400° F. for 4 hours.
[3] IR readings taken at the end of the twelve (12) minute run.
[4] Values are for at least two runs with a single sulfur determination (Leco technique) per run.

Table II summarizes the results of cracking representative gas-oil feedstock in a laboratory unit (MAT) with HFZ-20 catalyst and various amounts of alumina supported metal additives shown in Table I to be effective for SOx pickup. Data in Table II show that while $CrO_3$ supported on alumina had little effect on weight percent conversion of feedstock, gasoline, LCO and gas (i.e., C₄ minus) when compared to an appropriate reference, only calcined alumina and $CeO_2$ and $CeO_2$-containing rare earth oxide mixture on gamma alumina had minimal effect on the coke-producing tendency of HFZ catalyst as seen in the weight percent coke and even more dramatically in the $H_2/CH_4$ mole ratio values.

TABLE II

MAT EVALUATION OF POTENTIAL SOₓ REDUCTION CATALYSTS[1]

| SAMPLE[2] | Wt % Conversion | Wt % Coke | H₂/CH₄ Mole Ratio | Wt % Gasoline | Wt % LCO | Wt % (C₄ Minus) |
|---|---|---|---|---|---|---|
| HFZ-20 (@ 1450° F.)[b] | 80.6 | 5.06 | 0.69 | 49.4 | 14.7 | 21.7 |
| 80% HFZ-20 (@ 1400° F.) | | | | | | |
| 80% HFZ-20 + 20% (γ-Al₂O₃-1800)[b] | 80.6 | 5.29 | 0.85 | 48.3 | 14.2 | 20.9 |
| 80% HFZ-20 + 20% (8.2% CeO₂/γAl₂O₃)[a] | 80.6 | 5.58 | 0.79 | 48.1 | 13.9 | 20.8 |
| HFZ-20 (@ 1500° F.)[b] | 65.1 | 3.44 | 1.16 | 38.8 | 22.3 | 19.2 |
| 80% HFZ-20 (@ 1500° F.)[b] | | | | | | |
| 80% HFZ-20 + 20% (γ-Al₂O₃-1100) | 63.8 | 3.55 | 1.65 | 37.0 | 22.1 | 18.3 |
| 80% HFZ-20 + 20% (4.7% REO/γ-Al₂O₃) | 65.3 | 3.75 | 1.60 | 38.7 | 22.6 | 19.6 |
| 80% HFZ-20 + 20% (5.4% CeO₂/γ-Al₂O₃) | 67.8 | 3.97 | 1.65 | 39.0 | 20.0 | 19.4 |
| 80% HFZ-20 + 20% (1.7% CrO₃/γ-Al₂O₃) | 68.0 | 5.46 | 5.33 | 36.9 | 21.0 | 21.2 |

[1] MAT conditions - Catalyst/oil ratio = 5; space velocity = 15; delivery time = 48 sec.; bed temperature = 910° F.
[2] Determinations are for an average of two MAT runs except for [a] = 3 runs and [b] = 4 runs; HFZ-20 steamed at temperature indicated for 4 hours with 100% steam while additive was steamed @ 1400° F. for four hours with 100% steam; REO = 60% La₂O₃, 6% CeO₂, 8% Pr₆O₁₁, 25% Nd₂O₃, 1% other; γAl₂O₃-1100 was obtained via calcination of CATAPAL SB @ 1100° F.

It is important to note that, unlike $CrO_3$ on alumina, which the prior art describes for the promotion of coke burnoff, up to 8% $CeO_2$ on alumina did not significantly increase the coke-producing tendencies of HFZ catalysts.

Further studies indicated that the addition of 8.1% $CeO_2$ to alumina particles significantly increased SOx pickup over that for the pure alumina additive, i.e., 64% for 1 gram of 8.2% $CeO_2/\gamma$-$Al_2O_3$ versus 14% for 1 gram of $\gamma$-$Al_2O_3$ added to 12 grams of cracking catalyst. It was also observed that the level of rare earth oxides, as well as the amount of cerium in the rare earth mixture supported on the alumina, affected both the SOx reduction capability and the degree of CO oxidation of the additive, i.e., increased amount of $CeO_2$ increases both SOx reduction and CO oxidation.

It was further found that the increased SOx reduction ability of rare earth oxide(s) on alumina was not due to a stabilization of the fresh alumina as described in U.S. Pat. No. 3,993,573. Under the hydrothermal deactivation conditions used, 5.4% $CeO_2$ on $\gamma$-$Al_2O_3$, having a surface area less than that of steamed pure alumina, was found to be much more active towards SOx pickup than an equivalent amount of fresh (unsteamed) alumina.

Other tests were carried out to determine the effect of using cerium supported alumina in physical mixture with a solid platinum oxidation promoter. The promoter was produced by impregnating a solution of chloroplatinic acid on fluidizable particles of a silica-alumina support having a B.E.T. surface area of about 12 m²/g. These particles contained 60 p.p.m. platinum expressed as the metal. Data on the relative effectiveness of $CeO_2$ supported on alumina and alumina plus a CO oxidation promoter (platinum) showed that both systems were substantially more active for SOx reduction that was a pure alumina additive. The date also showed that 5.4% $CeO_2$ on alumina was more active for SOx reduction than an equivalent amount of alumina plus particles of the supported platinum CO oxidation promoter. The addition of a platinum CO oxidation promoter to $CeO_2$ on alumina further increased its SOx pickup. Such an increase could be important in meeting environmental control specification.

Other tests showed that 6% cerium oxide supported on the gamma alumina particles did not lose much of its SOx pickup ability when temperature was raised from 1100° to 1300° F. This is very important since this additive can therefore be used under a wide range of regenerator conditions without loss of effectiveness. In contrast the ability of pure alumina to pick up SOx was significantly less at 1300° F. than at 1100° F.

EXAMPLE II

This example illustrates practice of the embodiment of the invention wherein the alumina support for rare earth is a component of particles of a fluidizable cracking catalyst (HFZ®-33 catalyst). HFZ-33 catalyst was selected because it is unusually high in content of transitional alumina (gamma) compared to other commercial cracking catalysts.

A chemical analysis of representative samples of HFZ-33 catalyst is as follows:

|  | Wt. %, L.O.I.-free base |
|---|---|
| L.O.I. | 14.5 |
| $Al_2O_3$ | 59.6 |
| $SiO_2$ | 37.0 |
| $Na_2O$ | 0.6 |
| $TiO_2$ | 2.3 |
| $Fe_2O_3$ | 0.6 |
| ReO | — |
| $NH_4$ (as is weight base) | 2.3 |

While the catalyst analyzes about 60% $Al_2O_3$, part of the alumina is in the zeolite and thus not present in free form. X-ray analysis, using conventional procedures, showed that the catalyst contained approximately 27% zeolite. Examination of the x-ray diffraction pattern of HFZ-33 catalyst indicated that the catalyst contained about 28% by weight gamma alumina. (Representative samples of those other commercial FCC catalysts analyzed 0.2%, 2.8% and 7.5% gamma alumina by the X-ray technique.) In making the determination of the alumina content of HFZ-33, it was necessary to integrate the area defined by the X-ray peak characteristic of gamma alumina. It was not possible to separate physically the gamma alumina from other components of HFZ-33 catalyst. Therefore surface area of the gamma alumina could not be determined.

In accordance with this invention HFZ-33 was modified by impregnation with a cerium nitrate solution and calcined in the presence of oxygen to deposit about 6% cerium oxide, calculated as $CeO_2$, on the catalyst particles. In similar manner, about 8% cerium oxide was deposited on another sample of HFZ-33. The procedure was repeated with a commercial lanthanum-rich rare earth nitrate solution for purposes of comparison. The mixed rare earth was reported to contain 60% $La_2O_3$, 6% $CeO_2$, 8% $Pr_6O_{11}$, 25% $Nd_2O_3$ and 1% others. As mentioned, HFZ-33 as supplied does not contain rare earth.

The impregnation of dry HFZ-33 was carried out by contacting the catalyst particles with cerium nitrate or mixed rare earth nitrate solutions, adding 0.63 ml. of solution per gram of HFZ-33. The impregnated support was dried at about 200° F. and then calcined at 1100° F. and in the presence of oxygen.

As a control, HFZ-33 without rare earth or cerium addition was tested.

SOx absorption was measured by the fixed-fluidized test unit described in Example I. Test sample was contacted with 200 cc./min. of a gas mixture consisting of 2300 p.p.m. $SO_2$, 2.5% CO, 3.6% $CO_2$ and 2.0% $O_2$ in $N_2$ for twelve minutes at 1200° F. The percent reduction of $SO_2$ indicated by IR was also compared to percent SOx picked up determined by an analytical method (LECO).

All samples were steamed for four hours at 1400° F. prior to testing to simulate an equilibrium condition.

Results of SOx pickup under conditions simulating the environment of a regenerator operated without complete CO oxidation, as described above, produced results summarized below in Table III.

TABLE III
EFFECT OF CERIUM OXIDE IMPREGNATION OF CATALYST PARTICLES ON $SO_x$ IN FCC REGENERATOR

| Catalyst | % $SO_x$ Sorbed on Catalyst |
|---|---|
| HFZ-33 | 17 |
| HFZ-33 with 5.93% $CeO_2$ | 30 |
| HFZ-33 with 5.50% Mixed Rare Earth Oxides | 24 |
| HFZ-33 with 7.41% $CeO_2$ | 43 |
| HFZ-33 with 7.53% Mixed Rare Earth Oxides | 34 |

The results summarized in Table III show that the presence of rare earth improved SOx removal by the HFZ catalyst and that pure cerium was superior to mixed rare earth at all levels of addition. Therefore the use of pure cerium or cerium-rich rare earth mixtures is preferred in the preparation of modified FCC catalysts that can provide lowered SOx emissions. The data show that 7.41% $CeO_2$ was markedly superior to 5.93% in terms of SOx pickup.

A more thorough evaluation of both SOx pickup and regeneration was carried out on a sample of HFZ-20 catalyst impregnated with 8.7% $CeO_2$ in the manner described above. Significant reduction of SOx emissions resulted when the sample was steamed and then circulated through a laboratory FCC unit including a reactor and regenerator. This unit was described in a paper titled "LABORATORY CIRCULATING FLUID BED UNIT FOR EVALUATING CARBON EFFECTS ON CRACKING CATALYST SELECTIVITY" presented by S. J. Wachtel et al at the American Chemical Society meeting of Sept. 12–17, 1971.

EXAMPLE III

Similar tests were carried out with a commercial product, HEZ®-55 cracking catalyst. This catalyst has a chemical composition similar to that of HFZ-33 but HEZ-55 contains about 2% rare earth, where FHZ-33 is free of rare earth. Although HEZ-55 contains about the same amount of gamma alumina as HFZ-33 and also contains rare earth introduced during catalyst manufacture, the two catalysts exhibited comparable capacity to associate with SOx under regeneration conditions and release the SOx as $H_2S$ under cracking conditions. This finding shows that the mere presence of both rare earth and gamma alumina in FCC catalyst particles will not in itself result in a cracking catalyst having outstanding ability to associate with oxides of sulfur in a FCC regenerator and release them as $H_2S$ in the cracking zone. Thus, it was necessary to have a sufficient quantity of rare earth deposited on the alumina in the particles of cracking catalyst, a result not necessarily achieved when rare earth is introduced during catalyst manufacture.

EXAMPLE IV

Other tests were conducted with CBZ®-1 catalyst, a commercial zeolitic catalyst containing rare earth (above 3% by weight) and less than 1% gamma alumina as determined by X-ray diffraction. When cerium was impregnated on this catalyst, the fresh catalyst was considerably more effective than the unimpregnated catalyst in reducing SOx emissions. However, when the impregnated catalyst was steamed, the improvements achieved by impregnation with cerium were negated. This indicates that the combination of rare earth and alumina was necessary.

This conclusion was further supported by the finding that when CBZ-1 was mixed with 5 to 23% by weight of separate entities containing $CeO_2$ supported on gamma alumina (7% $CeO_2$) and prepared as described in Example I, there was outstanding reduction of SOx at 1100° and 1300° F. when the mixture was steamed and then circulated through a laboratory FCC unit including a reactor and regenerator. However when unimpregnated gamma alumina was mixed with the catalyst and the mixture steamed and evaluated in the circulating unit, it was found that alumina was significantly deactivated and did not exhibit the outstanding ability to reduce SOx emissions achieved when cerium was supported on the alumina entities circulated with the catalyst particles.

From analysis of $CO_2$/CO ratios in the flue gas it was also observed that the zeolitic catalyst particles could be circulated with the cerium supported alumina particles to reduce SOx emissions without causing excessive temperature increases in the regenerator.

EXAMPLE V

Tests were carried out to compare the effectiveness of the following materials deposited by impregnation on fluidizable gamma alumina entities prepared as described in Example I: pure $CeO_2$, rare earth oxide mixture containing 48% by weight $CeO_2$; lanthanum-rich rare earth oxide mixture containing 6% $CeO_2$. These rare earth oxides were deposited in various amounts on gamma alumina particles for further purposes of comparison.

All rare earth salts were impregnated as nitrate salts and the impregnated particles were calcined at 1100° F. for three hours to eliminate oxides of nitrogen and convert rare earths to oxide form. The rare earth containing 48% $CeO_2$ (hereinafter designated "48% $CeO_2$" for purposes of simplification) analyzed 48% $CeO_2$, 34% $La_2O_3$, 13% $Nd_2O_3$, 4% $Pr_6O_{11}$, 1% others. Rare earth containing 6% $CeO_2$ ("6% $CeO_2$") analyzed 6% $CeO_2$, 60% $La_2O_3$, 25% $Nd_2O_3$, 8% $Pr_6O_{11}$, 1% others. The calcined alumina supported rare earth oxides were steamed at 1400° F. for four hours with 100% steam before determining SOx pickup and analyzed CO in the gaseous effluent. The test procedure is described in Example I and was carried out for twelve minutes with 200 cc./min. of reaction gas containing the following: CO (4.5%); $CO_2$ (6.5%); $SO_2$ 2900 p.p.m.; $O_2$ (3.0%) in $N_2$ at 1200° F. The concentration of CO was monitored at four minute intervals during the twelve minute test period.

A summary of the results appears in Table IV.

From data in Table IV it was found that optimum SOx reduction occurred at about 6% loading for pure $CeO_2$ and a rare earth mixture containing 48% $CeO_2$, while a loading of about 12% rare earth oxide was required for optimum SOx reduction using the lanthanum-rich rare earth oxide containing 6% $CeO_2$.

Selectivity factors, i.e., percent SOx pickup/percent CO oxidation in Table IV, indicate that the slightly more active supported catalyst containing pure $CeO_2$ exhibited the same SOx reduction selectivity as the supported catalyst impregnated with rare earth containing 48% $CeO_2$. In contrast the use of lanthanum-rich rare earth mixture containing only 6% $CeO_2$ resulted in a product that was less active but more selective for SOx reduction.

TABLE IV

EFFECT OF RARE EARTH OXIDE SUPPORTED ON GAMMA ALUMINA ON SOx REDUCTION AND CO OXIDATION OF FCC REGENERATOR GAS

| SAMPLE | | | CO REDUCTION | | | SELECTIVITY FACTORS SOx PICKUP/CO OXIDATION | |
|---|---|---|---|---|---|---|---|
| Wt. % $CeO_2$ In Rare Earth | Wt. % Rare Earth On Alumina | SOx Pickup | IR READINGS AFTER | | | | |
| | | | 4 min. | 8 min. | 12 min. | 4 min. | 8 min. |
| (control) | 0 | 14% | 12% | 9% | 7% | 1.2 | 1.6 |
| 100 | 0.61 | 15% | 31% | 13% | 11% | 0.5 | 1.2 |
| 48 | 0.34 | 16% | 25% | 12% | 10% | 0.6 | 1.3 |
| 6 | 0.57 | 14% | 12% | 7% | 6% | 1.2 | 2.0 |
| 100 | 1.4 | 29% | 43% | 15% | 8% | 0.7 | 1.9 |
| 48 | 1.8 | 20% | 26% | 13% | 8% | 0.8 | 1.5 |
| 6 | 1.6 | 15% | 31% | 10% | 7% | 0.5 | 1.5 |
| 100 | 7.1 | 35% | 58% | 32% | 17% | 0.6 | 1.1 |
| 48 | 6.7 | 32% | 46% | 26% | 13% | 0.7 | 1.2 |
| 6 | 6.4 | 24% | 22% | 13% | 7% | 1.1 | 1.8 |
| 100 | 11.3 | 31% | 59% | 26% | 13% | 0.5 | 1.2 |
| 48 | 11.0 | 35% | 68% | 36% | 20% | 0.5 | 1.0 |
| 6 | 11.3 | 31% | 31% | 20% | 13% | 1.0 | 1.6 |

| Average Selectivity Factors | | |
|---|---|---|
| Wt. % $CeO_2$ In Rare Earth | 4 min. | 8 min. |
| 100% $CeO_2$ | 0.6 | 1.1 |
| 48% $CeO_2$ | 0.7 | 1.3 |
| 6% $CeO_2$ | 1.1 | 1.9 |

This invention has been described with respect to specific embodiments and examples. It will be understood that the invention is not limited thereto and that it can be variously practiced within the scope of the following claims.

We claim:

1. A process of continuous cyclic fluid catalytic cracking with reduced emission of sulfur oxides from regenerator gaseous effluent which comprises (a) contacting a hydrocarbon feedstock containing organic sulfur compounds in the absence of added hydrogen with a circulating inventory comprising cracking catalyst microspheres and separate discrete fludizable attrition-resistant particles of rare earth metal impregnated on dense microspheres of gamma alumina in a reaction zone in a riser cracker at about 900° to 1000° F. for about 0.5 to about 5 seconds to produce lower boiling hydrocarbons and to cause deposition on said catalyst microspheres of solid deactivating sulfur-containing carbonaceous material, said dense microspheres of gamma alumina having been prepared by slurrying particles of alpha alumina monohydrate in an acid solution, spray drying the slurry to form microspheres and heating the resulting microspheres to convert the alumina to gamma form before impregnating rare earth metal thereon; (b) removing said catalyst microspheres and said separate particles containing said deposit from the reaction zone and stripping volatiles therefrom with steam in a stripping zone; (c) regenerating said stripped particles by oxidation at elevated temperature in a regenerating zone at a temperature in the range of about 1100° to about 1400° F. for about 3 to about 120 minutes with combustion of carbon monoxide to carbon dioxide to burn off residual sulfur-containing carbonaceous deposit, producing a gaseous regeneration zone effluent containing oxides of sulfur and (d) removing regenerated catalyst microspheres and said separate particles from said regenerating zone and recycling them to the reaction zone, whereby emissions of oxides of sulfur in said gaseous regeneration zone effluent are reduced substantially as a result of association of oxides of sulfur with said separate particles during step (c) and disassociation of associated oxides of sulfur into a gaseous product consisting essentially of hydrogen sulfide during steps (a) and (b).

2. The process of claim 1 wherein said separate particles are present in an amount in the range of about 5 to about 25% by weight of the mixture with said catalyst particles.

3. The process of claim 1 wherein said separate particles contain rare earth metal, expressed as the oxide, in an amount in the range of about 0.5 to 25% by weight.

4. The process of claim 1 wherein said separate particles contain rare earth metal, expressed as the oxide, in an amount in the range of about 2 to 10% by weight.

5. The process of claim 1 wherein said separate particles contain rare earth metal, expressed as the oxide, in an amount of about 7% by weight.

6. The process of claim 1 wherein said catalyst particles contain a zeolitic molecular sieve component.

7. The process of claim 1 carried out in the absence of a strong carbon monoxide oxidation promoter.

8. The process of claim 1 carried out in the presence of a strong carbon monoxide oxidation promoter.

9. The process of claim 1 wherein said separate particles are prepared from previously spray dried particles of alpha alumina monohydrate in water in the presence of nitric acid as a dispersant and aging the resulting mixture until a viscous slurry of alpha alumina monohydrate is obtained, spray drying said viscous slurry to produce microspheres and heating the resulting microspheres to convert the alumina to gamma form before impregnating rare earth metal thereon.

10. The process of claim 1 wherein microspheres prepared by spray drying said particles of alpha alumina monohydrate are heated at temperatures in the range of 1000° to 1200° F. before impregnating rare earth metal thereon.

11. The process of claim 1 wherein said rare earth metal is selected from the group consisting of cerium, mixtures of rare earth metals rich in cerium, lanthanum and mixtures of rare earth metals rich in lanthanum.

12. The process of claim 3 wherein said rare earth metal is selected from the group consisting of cerium, mixtures of rare earth metals rich in cerium, lanthanum and mixtures of rare earth metals rich in lanthanum.

13. The process of claim 4 wherein said rare earth metal is cerium.

14. The process of claim 5 wherein said rare earth metal is cerium.

* * * * *